United States Patent [19]

Deminet et al.

[11] Patent Number: 5,604,642
[45] Date of Patent: Feb. 18, 1997

[54] LASER WELDING OF LIGHT-WEIGHT HONEYCOMB MIRRORS

[75] Inventors: Czeslaw Deminet; George Luke, both of Albuquerque, N.M.

[73] Assignee: The United States of America as represented by the Secretary of the Air Force, Washington, D.C.

[21] Appl. No.: 376,588

[22] Filed: Jan. 20, 1995

[51] Int. Cl.⁶ .................................................. G02B 5/08
[52] U.S. Cl. ........................ 359/848; 359/201; 359/871
[58] Field of Search ................................ 359/201, 202, 359/846–848, 851, 855, 857, 871; 219/121.63, 121.64, 121.8, 121.85; 65/36, 42; 156/89, 272.8

[56] References Cited

U.S. PATENT DOCUMENTS

| | | | |
|---|---|---|---|
| 3,514,275 | 5/1970 | Bray | 65/33 |
| 3,644,022 | 2/1972 | Jagdt et al. | 359/848 |
| 3,912,380 | 10/1975 | Klein | 350/310 |
| 4,124,277 | 11/1978 | Stang | 350/310 |
| 4,387,952 | 6/1983 | Slusher | 359/220 |
| 4,466,700 | 8/1984 | Christiansen et al. | 359/848 |
| 4,579,448 | 4/1986 | Nowak et al. | 355/51 |
| 4,785,192 | 11/1988 | Bruning | 250/548 |
| 4,917,934 | 4/1990 | Sempolinski | 428/116 |
| 5,157,556 | 10/1992 | Hügenell | 359/849 |
| 5,353,231 | 10/1994 | Sasaki et al. | 364/473 |
| 5,489,321 | 2/1996 | Tracy et al. | 65/43 |

*Primary Examiner*—Paul M. Dzierzynski
*Assistant Examiner*—Darren E. Schuberg
*Attorney, Agent, or Firm*—Thomas C. Stover

[57] ABSTRACT

The invention provides method and apparatus for making light-weight honeycomb mirrors by assembling fused quartz ribs in a honeycomb pattern so that rib ends are proximate other rib ends to form rib junctions. A laser beam is then directed at the rib junctions to weld the rib ends together to form a honeycomb structure having a plurality of rib-defined cells or modules therein. Fused quartz plates of matching size are then positioned across the so-formed rib cells and welded by directing a high powered laser beam at the edges of the plates and adjacent ribs to weld the plates to the rib cells of the honeycomb structure and define a honeycomb mirror blank. The surface of the plates of, e.g. fused quartz, are then ground and polished to a mirror finish and a reflective coating added, to complete the light-weight honeycomb mirror by the method and apparatus of the invention.

24 Claims, 4 Drawing Sheets

HONEYCOMB RIB

LASER WELDING OF LIGHT-WEIGHT HONEYCOMB MIRRORS

STATEMENT OF GOVERNMENT INTEREST

The invention described herein may be manufactured and used by or for the Government for governmental purposes without the payment of any royalty thereon.

BACKGROUND OF THE INVENTION

1. Field of the Invention

This invention relates to method and apparatus for preparing light-weight honeycomb mirrors, particularly by laser welding of the mirror components.

2. The Prior Art

The construction of large vitreous honeycomb mirrors is a well developed technology. Conventionally, honeycomb support structure is fabricated either by hand-welding individual ribs or by assembling short sections of square tubing; the latter being less time consuming. A large one-piece (e.g. 3' dia.) face plate is cut, ground and polished and mounted on the honeycomb structure. The bonding of the honeycomb structure to the face plate, is accomplished under pressure and at high temperature within a furnace.

Another method of construction uses devitrifying solder glass to join the honeycomb to the face plate. This glass-ceramic material converts under heat treatment to a crystalline structure having a CTE matching that of the material to be joined.

The major problem with these conventional methods is the high cost of labor involved. For example, the mirror blank for the Hubble space telescope cost in excess of $2,000,000. A mirror formed by the method of the present invention as discussed below, can be considerably cheaper.

Another problem associated with established techniques has been the size limitation imposed due to the scaleability of a one-piece face plate. The laser-welded mirror of the invention being an assembly of a plurality of face plates (or tiles) can be made smaller or larger as desired, as discussed below.

Also the flame of a hand-held welding torch can stray off the weld line, overheating portions of quartz plates and causing cracking thereof.

Representative of the prior art are U.S. Pat. No. 4,124,277 to Stang and U.S. Pat. No. 3,917,380 to Klein. Neither of these patents disclose laser welding of mirrors to honeycomb-ribs as a method of mirror formation.

There is need however to provide a light-weight honeycomb mirror to overcome the above prior art shortcomings.

There has now been discovered a method for making light-weight honeycomb mirrors that are of relatively low weight and high strength and which can be made with narrow weld lines and at reduced cost.

SUMMARY OF THE INVENTION

Broadly the present invention provides a method for making light-weight honeycomb mirrors comprising, a) assembling ribs in a honeycomb pattern so that rib ends are proximate other rib ends to form rib junctions, b) directing a laser beam at a plurality of the junctions to weld the rib ends together into a honeycomb structure having a plurality of rib-defined cells or modules, c) positioning a plate across one of the cells and d) welding the plate to a plurality of ribs defining the cell.

Also the invention provides an apparatus for making light-weight honeycomb mirrors comprising a) means for positioning ribs on a support member in a honeycomb pattern so that the rib ends are proximate other rib ends to form rib junctions, b) a laser beam source, c) means to direct the laser beam at a plurality of the rib junctions to weld the rib ends together into a honeycomb structure having a plurality of rib-defined cells or modules, d) means for positioning at least one face plate on one of the rib cells and e) means to direct the laser beam at the edges of the plate and adjacent ribs to weld same.

BRIEF DESCRIPTION OF THE DRAWINGS

The invention will become more apparent from the following detailed specification and drawings in which.

DESCRIPTION OF PREFERRED EMBODIMENTS

Figure 1:
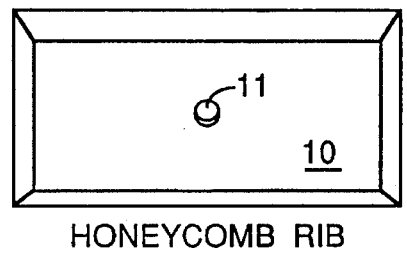
FIG. 1 is a plan view of a honeycomb rib employed in the mirror assembly of the present invention.
Figure 2:
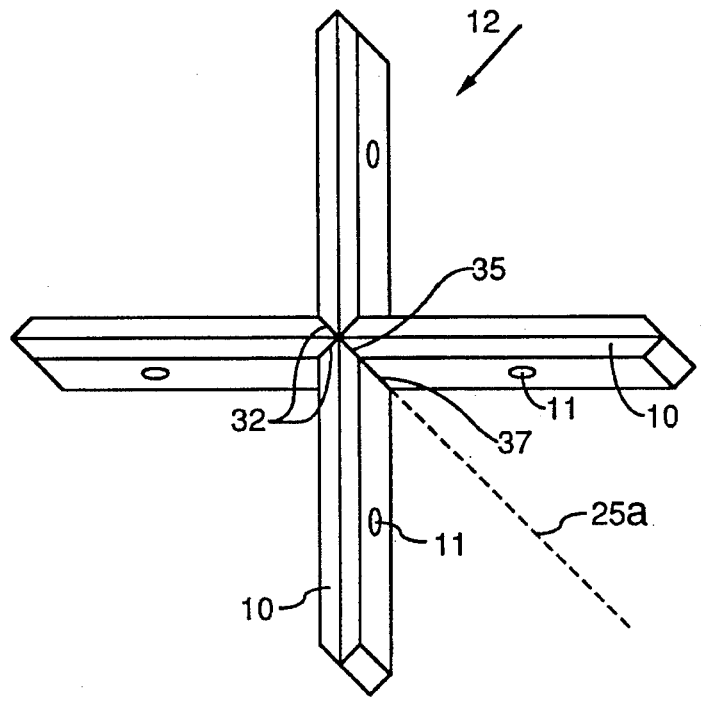
FIG. 2 is an elevation view of a plurality of the honeycomb ribs of FIG. 1 in position for welding into a honeycomb module per the method of the present invention.
Figure 3:
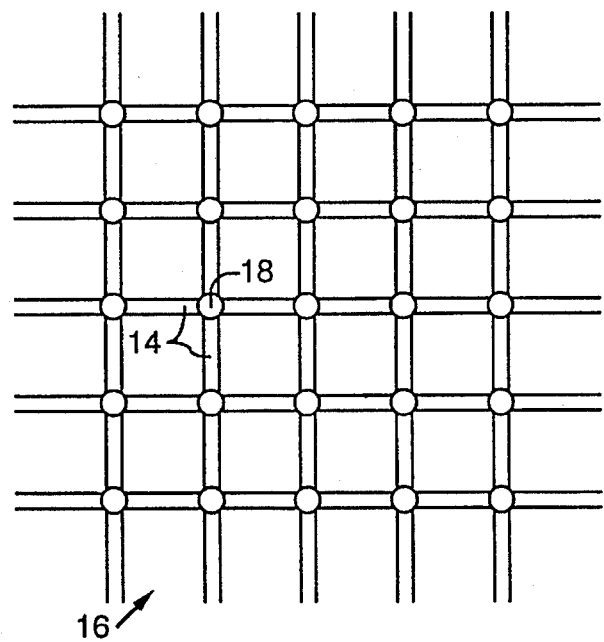
FIG. 3 is a tooling plate for positioning the rib sections into a honeycomb pattern.

Referring in more detail to the drawings, honeycomb rib 10 is assembled into a plurality of contacting modules 12 in the grooves 14 of a tooling plate 16, as shown in FIGS. 1, 2 and 3.

Figure 4:
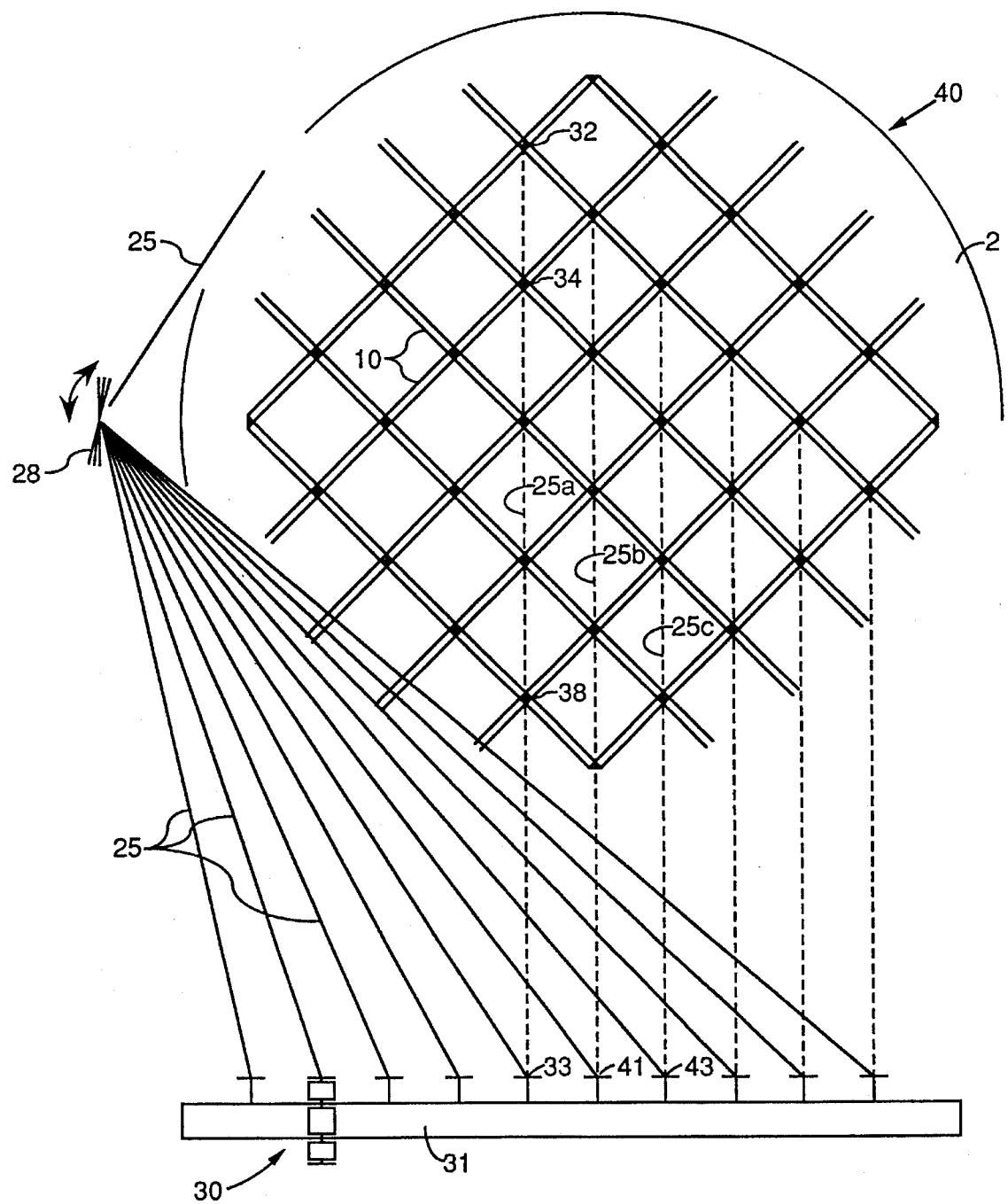
FIG. 4 is an elevation schematic view of the rib welding into honeycomb process per the present invention.
Figure 5:
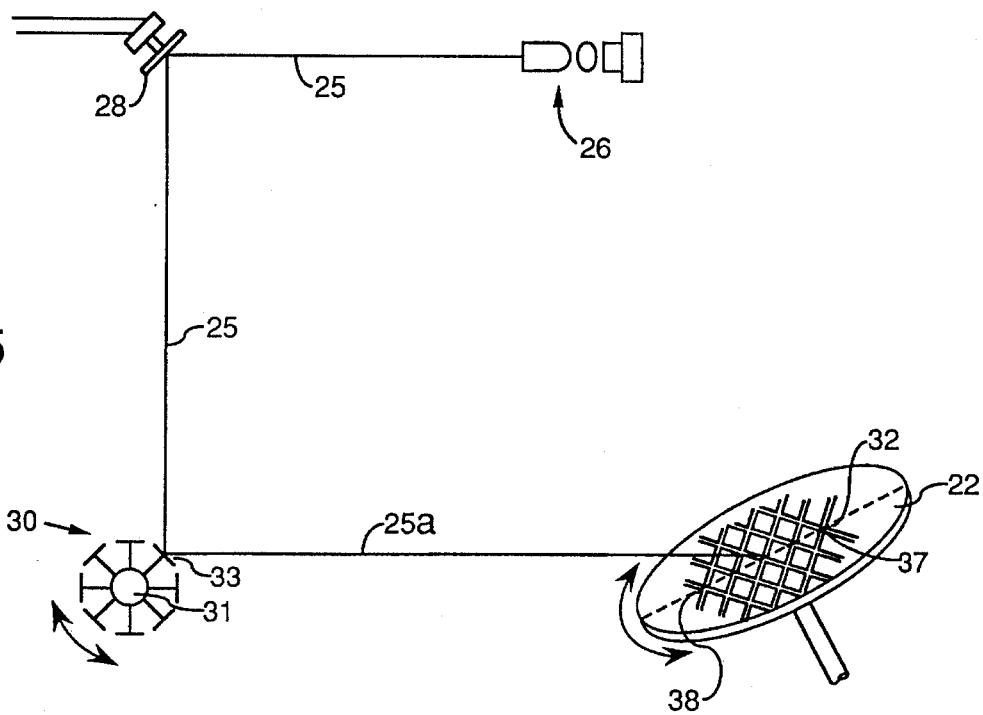
FIG. 5 is an end elevation schematic view of the process shown in FIG. 4.

The ribs, so positioned in the tooling plate 16 of FIG. 3, are then welded together by one or more laser beams into a honeycomb core as indicated in FIGS. 4 and 5.

That is, a honeycomb mirror structure can be constructed by assembling and laser-welding a rib frame as indicated in FIGS. 1–5. For a flat mirror having a structure of square honeycombs, all sides of the ribs are beveled at 45°, e.g. as shown in FIG. 1. Each rib is perforated with aperture 11, to assure equalization of pressure within the completed mirror assembly.

As noted above four such ribs 10 form a module 12 of the honeycomb structure of the mirror-to-be. These modules are self-supporting as each rib 10 is tightly fitted and registered within the tooling plate 16 shown in FIG. 3, where the ribs 10 fit into the grooves 14 of such plate 16. Also there is an aperture 18 drilled in the tooling plate 16 beneath each rib junction, to prevent welding of the ribs 10 to the tooling plate 16, as indicated in FIG. 3.

The tooling plate 16 with an entire honeycomb structure of separate but closely fitting ribs 10, is installed on a turntable 22, as shown or indicated in FIGS. 4 and 5. In the case of materials having significant thermal expansion, the welding can take place under, e.g. quartz lamps, which preheat the structure and prevent the welds from cracking due to thermal shock. However, with welding materials having negligible expansion, preheating is also recommended for heat conductivity purposes, as discussed below.

Welding of the rib junctions is accomplished by directing a laser beam 25 (from a laser emitter source 26) off a pivotable mirror 28 and then off a series of rotatable mirrors 30 and then to the rib junctions 32 on the turntable 22, as shown or indicated in FIGS. 4 and 5.

The mirror 28 is, e.g. computer controlled to direct the beam 25 to a series of mirrors 30 attached to a slowly (or intermittently) rotating shaft 31, as shown or indicated in FIGS. 4 and 5. The rib junctions 32, shown in FIGS. 2, 4 and 5, are welded across the top of such junction e.g. at line 35 and further if desired, along the sidewall junction 37, as shown in FIG. 2 and indicated in FIG. 5.

After the first rib junction 32 is welded on one side by the vertically traveling beam 25a as shown in FIGS. 2, 4 and 5, the shaft 31 is rotated so as to turn mirror 33 in concert with computer-controlled mirror 28 so as to redirect the beam 25a at the next rib junction in line or rib junction 34, as shown in FIG. 4. After rib Junction 34 is welded on one side as indicated in FIGS. 4 and 2, the shaft 31 is further rotated to weld succeeding rib junctions in line with beam 25a, until the last rib junction 38 is so welded, as indicated in FIG. 4.

After the rib junctions lying in the path of traveling laser beam 25a are welded, the computer controlled mirror 28 redirects the beam to the next mirror on the rotating shaft 31, i.e. mirror 41, to weld all the rib junctions in the path of the traveling laser beam 25b in the manner discussed above and indicated in FIG. 4.

In the manner discussed above and shown in FIG. 4, succeeding rib junctions lying on a laser beam line over a mirror on rotating shaft 31, are welded on one side in the manner indicated in FIG. 2, where rib weld lines 35 and 37 are shown.

After all of the accessible module joints are thus welded on one side, the turntable 20 is rotated 90° and another series of module joints are welded from the new direction, along the above discussed laser beam lines, e.g. lines of laser beams 25a, 25b and 25c, shown in FIG. 4, until all the accessible module joints are welded from the new side thereof in the manner discussed above.

After three such turns of the turntable 22, an application of the above welding sequence, as directed by mirrors 28 and e.g. mirrors 33, 41 and 43 (and the remaining mirrors on the shaft 30), the honeycomb assembly structure 40 is fully welded.

The honeycomb assembly is allowed to cool. Then small (e.g. 2" square) face plates of, e.g. silica, each of a size to fit the individual cells of the honeycomb structure and suitably beveled, are installed on the honeycomb cells, in adjoining rows, for welding thereto. Thus per FIGS. 6 and 7, face plate 44, having, e.g. 45° bevels at its under edges, e.g. edges 46 and 48 thereof, are installed on the honeycomb ribs 10 having matching beveled surfaces as shown.

With the face plates installed in adjoining rows on the honeycomb cells as shown or indicated in FIGS. 6, 7, and 9 and with the plate-rib assembly being suitably preheated (if necessary, as discussed below), a laser beam 25d travels down the seam between, e.g. adjoining rows of face plates 51 and 53, per FIG. 9 and welds the adjoining rows of plates to each other and to the ribs below. The beam 25d then travels in a parallel direction between other adjacent rows of face plates, e.g. between rows 53 and 55, as shown in FIG. 9, to repeat the above welding process until all face plates are so welded on opposed sides thereof in parallel directions.

Figure 9:
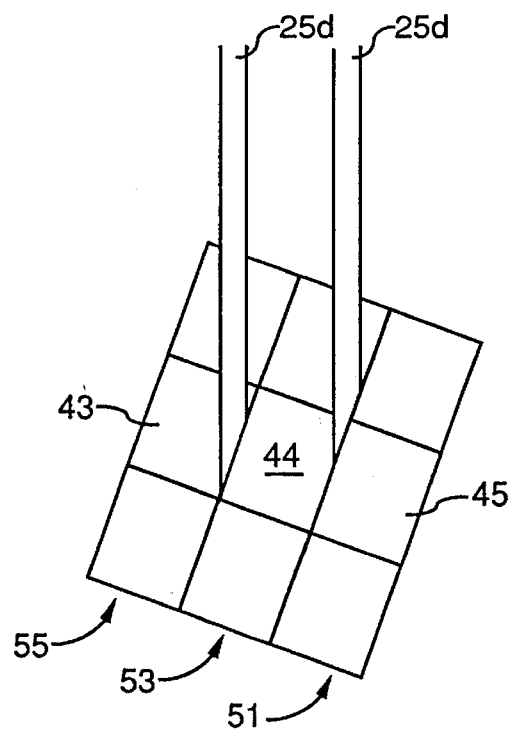

Then the turntable 22 is rotated 90° and the remaining parallel seams between adjoining rows of plates, are similarly welded in the manner shown in FIG. 9, so that all four sides of the face plates are welded to each other and to the underlying ribs in the honeycomb structure.

Thus opposed sides of each face plate (or in this case, squares) are welded using the above sets of mirrors (for welding the ribs into a honeycomb structure), but with the laser beam traveling, e.g. horizontally or other direction, as dictated by the orientation of such squares. As noted above, after these squares are welded onto opposing sides to adjoining squares and adjacent ribs, the turntable is rotated 90 degrees and the remaining two sides of the square are similarly welded, as indicated in FIGS. 6, 7, and 9.

Figure 6:
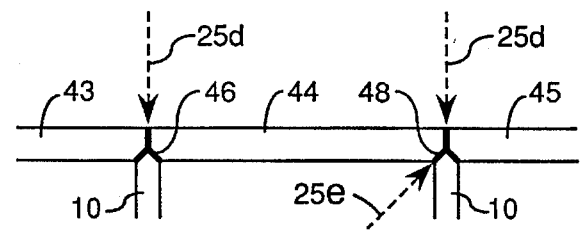
FIG. 6 is an elevation schematic view of components of the honeycomb mirror made per the present invention.
Figure 7:
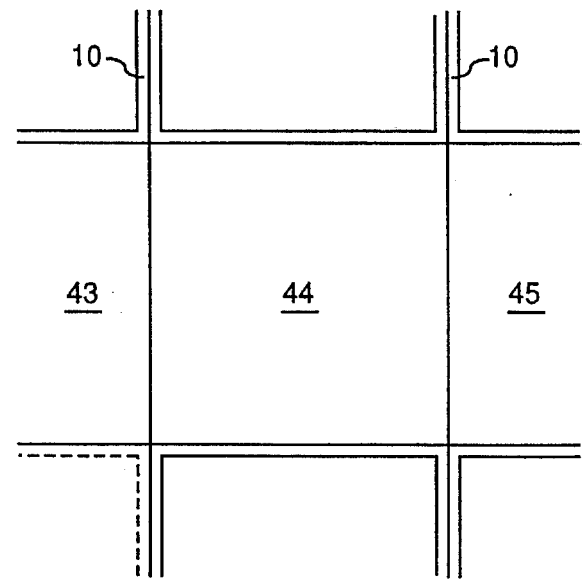
FIG. 7 is a plan schematic view of the components of FIG. 6, taken on line 7—7, looking in direction of the arrows

After the welding of the face plates are completed, the assembly shown in FIGS. 6, 7 and 9 of honeycomb structure and attached face plates, if desired, can be turned over and the welding procedure repeated between face plate and adjacent ribs on the underside of the face plates, e.g. at square 44, employing scanning laser beam 25e, as shown or indicated in FIG. 6.

In the above manner a plurality of face plates are installed and welded to a plurality of honeycomb cells to define a honeycomb blank assembly. The face plates, which are desirably of fused quartz, are then ground and polished to a mirror finish, to obtain the lightweight honeycomb mirror of the invention.

Thereafter the mirror surface is desirably coated with Al, Ag, Au or other highly reflective coating. Thus the method of the invention provides a lightweight honeycomb mirror of high strength.

Figure 8:
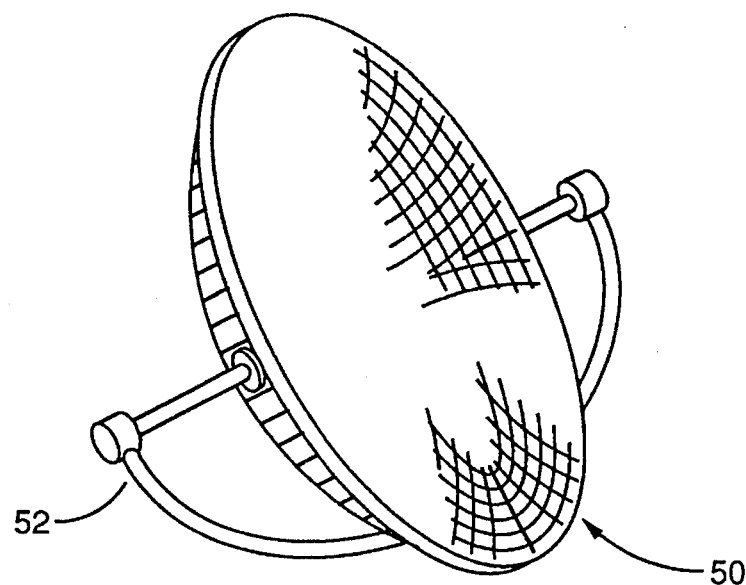
FIG. 8 is a perspective schematic view of an assembled and welded honeycomb mirror made by the method of the present invention.

A finished honeycomb mirror 50 pivotably mounted on a gimbal 52 is shown in FIG. 8.

For concave or convex mirrors of relatively large curvature, the ribs are cut so as not to define rectangles but trapezoidal shapes and beveled accordingly.

Thus in the case of fabricating curved mirrors by prior art techniques, the curvature must be accurately cut into a flat relatively large (e.g. 1 to 6 ft. diameter) flat quartz plate or slab. However, in the laser welded honeycomb mirror of the present invention, the curvature can be built into the structure by employing trapezoidal ribs of suitable dimensions to form a curved foundation for the face plate sections, as indicated above.

Also per the method of the invention, one can fabricate honeycomb mirrors having hexagonal or triangular honeycombs, with the ribs beveled accordingly and with tooling plates having corresponding angles for rib assembly therein of, e.g. 60° or 30° or other suitable angles respectively.

The honeycomb ribs can be made of silicon glass derivatives, including fused quartz or fused silica.

The face plates can have various shapes as dictated by the shape of the completed honeycomb mirror, which face plates can be made of silicon glass derivatives including fused quartz and preferably ULE (ultra low expansion) quartz, a proprietary material of Corning Inc. of Corning, N.Y.

The laser beam employed in the above welding step is from a medium energy laser source (e.g. 200 watts) such as a $CO_2$ laser or other suitable laser source.

The $CO_2$ laser can heat the rib junctions and/or plate-rib junctions in a narrow weld line or zone, up to 2000° C. or more.

However, there is a limit to which the laser beam can penetrate the rib junctions and/or the plate-rib junctions (of fused quartz or fused silica) to melt them. These materials have low thermal conductivities at room temperature. However conductivity increases with increasing temperature of the component, thus the need for preheating these materials. For example, at a temperature of 500° C., the thermal conductivities of the above materials are doubled. Such preheating also prevents cracking of the above materials as it avoids thermal stress formation.

The honeycomb ribs can be of any desired practical size depending upon application and shape of the desired honeycomb mirror. Such ribs can be suitably small if desired, e.g. ⅛th" thick by 1" long, with face plates of matching dimensions, e.g. in the case of a square, 1" by 1" by ⅛th" thick.

It is recommended that the ribs and plates of the invention be made of fused silica as ULE quartz is considerably more expensive.

The resulting honeycomb mirror of the invention is desirably concave and preferably parabolic in cross-section but can be flat, convex or other shape as desired.

What is claimed is:

1. A method for making light-weight honeycomb mirrors comprising,
    a) assembling ribs on a turntable in a honeycomb pattern so that rib ends are proximate other rib ends to form rib junctions,
    b) directing a laser beam at a plurality of said junctions on one side thereof to weld the rib ends together on said one side,
    c) rotating the so-welded ribs a sufficient number of degrees to present another side of said junctions to said laser beam and
    d) directing said laser beam at a succession of said rib junctions to weld each junction on at least one other side thereof so as to weld said ribs into a honeycomb structure having a plurality of rib-defined cells or modules,
    e) positioning a plate across of one said cells and
    f) welding said plate to a plurality of ribs defining said cell.

2. The method of claim 1 wherein said laser beam is directed at said rib junctions from a plurality of directions to weld said junctions on a plurality of sides thereof.

3. The method of claim 1 wherein said ribs are made of fused quartz as are said plates and a plurality of said plates are welded to said rib cells.

4. The method of claim 3 wherein after welding said plates to said rib cells, said plates are ground and polished to a mirror finish.

5. The method of claim 1 wherein a laser beam is directed at the underedges of said plate and the ribs adjacent thereto to further weld the under plate edges and adjacent ribs from below.

6. The method of claim 1 wherein said laser beam from its source, reflects off two spaced movable mirrors in series, the second mirror in the series, directing said beam to a desired rib junction for welding thereof, said second mirror then directing said beam to the next rib junction for welding thereof.

7. The method of claim 1 employing a $CO_2$ laser beam.

8. The method of claim 1 employing a plate selected from the group consisting of rectangular, trapezoidal, triangular, square, file-sided, six-sided and more sided.

9. The method of claim 1 employed in making honeycomb mirrors that are selected from the group consisting of flat, curved and a combination thereof.

10. A method for making light-weight honeycomb mirrors comprising:
    a) positioning ribs in a desired honeycomb pattern on a rotatable tooling plate so that rib ends are proximate other rib ends to form rib junctions,
    b) directing a laser beam at one of said junctions to weld same on one side of said junction,
    c) directing said beam to another of said junctions to weld said ribs together on one side of said junction,
    d) repeating the above steps to weld a plurality of rib junctions on one side thereof,
    e) rotating said tooling plate and the so-welded ribs a sufficient number of degrees to present another side of said junctions to said laser beam and
    f) directing said laser beam at a succession of said rib junctions to weld each junction on said other side and again rotating the so-welded rib assembly a sufficient number of degrees to weld said junctions on yet another side thereof to weld said ribs into a honeycomb structure, having a plurality of rib-defined cells or modules,
    g) positioning a plate across one of said cells,
    h) laser welding the edges of said plate to adjacent ribs defining said cell and
    i) repeating the above plate-welding steps to weld a plurality of plates to the ribs in a plurality of said cells.

11. The method of claim 10 wherein said honeycomb mirror is turned over and a laser beam is directed to an under edge of said plate where it meets a rib to further weld plate edge and rib from below and repeating said steps to underweld a plurality of plate edges and adjacent ribs and repeating such underwelding steps with a succession of said plates to underweld a plurality of said plates to said rib cells.

12. The method of claim 10 wherein said plates are made of fused quartz and after said plates are underwelded to said honeycomb structure, the upper surfaces of said plates are ground and polished to a mirror finish to define said honeycomb mirror.

13. The method of claim 12 wherein the polished plates are coated with a coating selected from the group consisting of Al Ag and Au.

14. The method of claim 10 wherein said ribs are initially assembled in grooves on a turntable in a honeycomb pattern so as to form rib junctions and after laser welding said junctions, the so-welded ribs are turned by turning said turntable for welding of said junctions on another side thereof.

15. The method of claim 14 wherein after said rib junctions are laser welded on one side, ribs and turntable are rotated 90° to weld said rib junctions on another side thereof.

16. The method of claim 10 wherein a plurality of plates are positioned in adjoining rows on a like number of cells of said honeycomb structure and directing a laser beam along the seam of a pair of adjoining rows of said plates to weld, said plates to each other and to their underlying ribs and then directing said beam along parallel seams of said plates to weld said plates on opposed sides thereof, to each other and to their underlying ribs and then rotating the rib and plate assembly 90° and repeating the above parallel welding process to weld the remaining opposed sides of the plates to each other and to their underlying ribs.

17. The method of claim 16 wherein said ribs and plates are preheated before the welding step, to increase the thermal conductivity thereof to aid such welding step.

18. The method of claim 10 wherein said ribs and plate are preheated before the welding step, to increase the thermal conductivity thereof to aid such welding step.

19. An apparatus for making light-weight honeycomb mirrors comprising,
   a) means for positioning ribs on a support member in a honeycomb pattern so that the rib ends are proximate other rib ends to form rib junctions, said support member being a turntable which has grooves for positioning said ribs in said honeycomb pattern,
   b) a laser beam source,
   c) means to direct said laser beam at a plurality of said rib junctions to weld the rib ends together into a honeycomb structure having a plurality of rib-defined cells or modules,
   d) means for positioning at least one face plate on one of said rib cells and
   e) means to direct said laser beam at the edges of said plate and adjacent ribs to weld same.

20. The apparatus of claim 19 having means to weld said rib junctions on one side thereof and means to turn said turntable sufficiently to weld said rib junctions on at least another side thereof to define said honeycomb structure.

21. The apparatus of claim 19 wherein said means for directing said laser beam at a plurality of said rib junctions are least two spaced movable mirrors mounted in series, the first mirror in the series directing said beam to the second mirror, said second mirror directing said beam to a desired rib junction for welding thereof and means for re-orienting one or both of said mirrors to direct said beam to the next rib junction for welding thereof.

22. The apparatus of claim 21 wherein said first mirror is a computer controlled mirror.

23. The apparatus of claim 21 wherein said second mirror is mounted on a rotatable shaft, which shaft has one or more additional mirrors mounted thereon, which can revolve into position to serve as said second mirror.

24. The apparatus of claim 19 wherein said mirrors and said turntable are computer controlled for accurate and uniform welding of rib junctions and of plates to said rib defined cells.

* * * * *